United States Patent [19]
Wiebe

[11] Patent Number: 5,286,068
[45] Date of Patent: Feb. 15, 1994

[54] HOSE CONNECTION

[76] Inventor: Jacob Wiebe, 60 Heaton Avenue, Winnipeg, Manitoba, Canada, R3B 3E3

[21] Appl. No.: 942,934

[22] Filed: Sep. 10, 1992

[51] Int. Cl.$^5$ .............................................. F16L 13/04
[52] U.S. Cl. .................................... 285/114; 285/258; 285/281
[58] Field of Search ................ 285/114, 115, 116, 251, 285/258, 281

[56] References Cited

FOREIGN PATENT DOCUMENTS

| 845290 | 7/1952 | Fed. Rep. of Germany | 285/251 |
| 1199001 | 12/1959 | France | 285/251 |
| 11240 | of 1889 | United Kingdom | 265/251 |
| 4765 | of 1915 | United Kingdom | 285/251 |
| 740440 | 11/1955 | United Kingdom | 285/251 |

Primary Examiner—Dave W. Arola
Attorney, Agent, or Firm—Adrian D. Battison; Stanley G. Ade; Murray E. Thrift

[57] ABSTRACT

A coupling for a flexible soft hose for example for a foam supply duct of a car wash includes a helical spring wrapped around the end of the hose with a spring on the end of the hose inserted into a sleeve member and abutting a shoulder within the sleeve member. A threaded insert member is then engaged through the sleeve member to the inside of the hose thus squeezing the hose outwardly to engage the inside surface of the spring. A swivel coupling can be provided on the male insert member using a replaceable O-ring and clip ring mounting.

6 Claims, 2 Drawing Sheets 5,286,068

HOSE CONNECTION

This invention relates to a hose connection connecting a metal end coupling to a flexible soft hose.

The most commonly used hose connection for use with flexible hoses includes a cylindrical member which is inserted into the interior of the hose and includes a barb on the outside surface for frictionally engaging the inside surface of the hose. Around the end of the hose and around the barbed insert is attached a hose clamp which squeezes the hose inwardly onto the barb.

This arrangement has a number of disadvantages. Firstly, the hose clamp is exposed on the outside surface and can therefore provide sharp edges against which a person or object can be damaged. Secondly, the hose clamp is accessible to the elements and accordingly can become corroded. Thirdly, if the hose is pulled transversely to the end of the barbed insert member, the hose can kink or collapse at a point of sharp turn thus restricting flow through the hose and causing mechanical working of the hose at the kink point which can lead to premature mechanical failure.

Another type of coupling commonly used with high pressure hoses comprises a threaded sleeve into which an end of the hose is inserted so that the outside surface of the hose is in frictional engagement with the interior threaded surface of the sleeve. An insert member is then screwed into the open end of the hose within the sleeve member by a screw thread connection between the insert member and a female thread on the sleeve member. This causes the hose to be forced outwardly by pressure from the inside surface by contact with the insert member so as to squeeze the end of the hose between the insert member and the inside surface of the sleeve.

This technique overcomes the disadvantages of the exposed hose clamp but does not resolve the problem of pinching of soft hoses when pulled transversely to the axial length of the coupling.

It is one object of the present invention, therefore, to provide an improved hose connection particularly for use with soft flexible hoses of a type used in relatively low pressure situations.

According to the invention, therefore there is provided a hose connection comprising a flexible cylindrical hose having an interior hose surface and an exterior hose surface, a helical coil spring wrapped helically around the exterior hose surface at one end of the surface and having an internal surface which is a friction fit around the exterior hose surface of the end of the hose, a sleeve member having an internal cylindrical bore opening at one end of the sleeve member, one end portion of the hose and the spring being received within the helical bore with a remaining part of the hose and the spring projecting outwardly from said one end of the sleeve member and an outer surface of the spring being a friction fit in said cylindrical bore, an opposed end of the sleeve member having an internally threaded female bore therein coaxial with said cylindrical bore and a male insert member having coupling means at one end for connection to a separate coupling and a male threaded insert portion at an opposed end engaged in said female bore and projecting into said interior hose surface and expanding said hose at said end outwardly into engagement with the spring.

One embodiment of the invention will now be described in conjunction with the accompanying drawing in which FIG. 1 is a cross sectional view of a hose connection according to the present invention.

FIG. 2 is a similar cross-sectional view showing a modified male insert portion with a swivel coupling.

DETAILED DESCRIPTION

Figure 1:
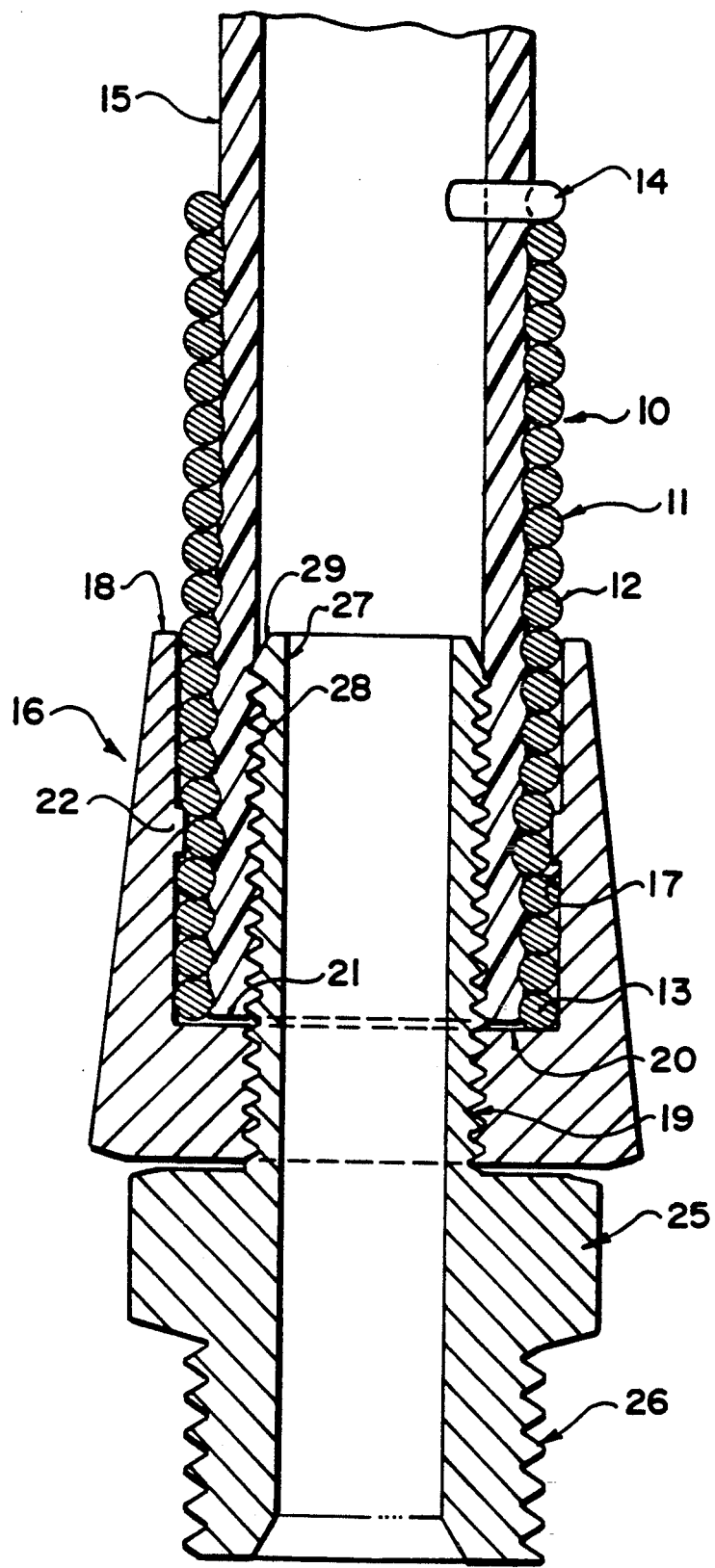

The hose connection comprises a flexible hose 10 of the type formed from vinyl or similar soft material which is sometimes reinforced with a fabric. The hose is however relatively collapsible and flexible and tends to collapse or kink when pinched or bent at an angle to its normal direction. This type of hose is however relatively inexpensive and is entirely suitable for low pressure type situations. For example in supplying liquid or foam in a car wash.

The connection further includes a helical spring 11 of a constant diameter and formed from a helically wrapped wire 12 extending from a first end coil 13 to a second end coil 14. The helical wire is wrapped so that the turns are closely adjacent or substantially touching so as to form a substantially wholly closed cylinder. However the connection will also operate effectively when using a spring which is slightly more open. The diameter of the spring is selected so that it is a friction fit with the outside surface 15 of the hose 10. Thus it is necessary for the spring to be rotated relative to the hose in a direction to open the spring to allow the spring to slide over the outside surface of the hose. The spring is relatively short so that it extends only over the coupling section with the hose of course extending outwardly from the end 14 of the spring to supply fluid or liquid through the hose to a remote location as required.

The connection further includes a sleeve member 16 defining an interior cylindrical bore 17 opening at one end 18 of the sleeve member 16. The sleeve member further includes a female bore portion 19 which is of a reduced diameter relative to the cylindrical surface 17 so as to form a shoulder 20 between the female bore portion 19 and the cylindrical surface 17.

The end 13 of the spring is coincident with an end 21 of the hose and these ends are both abutted against the shoulder 20. An annular rib 22 is provided on the inside of the sleeve member at a position approximately midway along the length of the cylindrical surface 17. A male insert member 25 includes a screw threaded coupling portion 26 at one end for attachment to a coupling nipple of a liquid supply duct. At the opposed end of the male insert member 25 is provided an insert portion 27 which is cylindrical in shape and has a male screw thread on the outside surface thereof for engagement into the female screw thread 19 of the sleeve member. The outside diameter of the insert portion 27 is equal to the diameter of the female bore 19 and also therefore equal to the inside diameter of the hose so as to engage against the inside surface 30 of the hose. The thread 28 on the outside surface of the insert member extends substantially along the full length so as to bite into the inside surface 30 of the hose. A short inclined lead in section 29 is provided at the end of the insert portion which reduces in diameter from the outside diameter of the thread slightly inwardly so as to assist in engaging the end of the insert member into the hose without pushing the hose longitudinally the sleeve member.

The insertion of the insert member into the sleeve member therefore acts to compress the hose between the threaded section 28 and the inside surface of the spring thus clamping or squeezing the hose section and forcing the hose surface 15 into engagement with the spring so as to cause some convolution of the outside surface to frictionally engage with the spring.

The coupling system therefore provides a simple coupling of four pieces without any abutments on the outside surface which could be contacted by a user. The spring protects the end of the hose against mechanical collapse when pulled sideways. The spring is automatically held in place by its cooperation in the coupling system.

Figure 2:
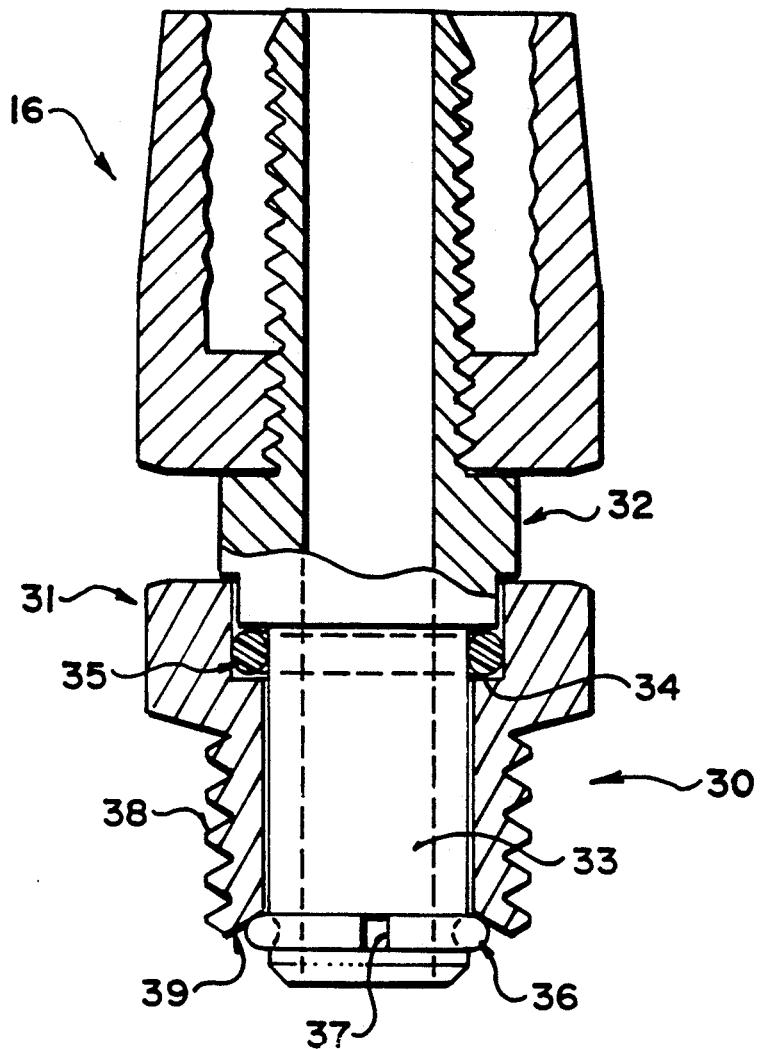

Turning now to FIG. 2, the arrangement shown and modified only in relation to the male insert member 30 which in this case is provided as a swivel connection including a swivel member 31 and a fixed portion 32 which engages into the sleeve member 16 as previously described. The fixed portion 32 includes a cylindrical projecting portion 33 which receives the swivel member 31 on the outside surface thereof. A recess 34 is defined between the swivel portion and the cylindrical member 33 which receives an O-ring seal 35 within the recess 34. The swivel member is held in place on the cylindrical portion 33 by a rigid clip ring 36 which includes broken ends 37 allowing it to be clipped in place within an annular recess within the outside surface of the cylindrical portion 33. The swivel member 31 includes a screw thread section 38 for engaging into a supply nipple. An end surface 39 of the swivel portion 31 is inclined to a radial plane so that slightly recessed back toward to the O-ring 35. This angle of the outer surface 39 assists in retaining the clip ring 36 in place.

The swivel coupling is thus repairable to replace the O-ring seal. In particular the clip ring is removable and is accessible in view of the positioning at the end of the cylindrical portion 33. The clip ring can therefore be accessed and removed using suitable players. When removed the male cylindrical portion 33 can be removed from the inside of the swivel portion and the O-ring removed unreplaced.

The simple swivel connection to the end of the hose allows the hose end to be properly protected to prevent collapse when pulled to one side and to prevent twisting and collapse when rotated at the outer end relative to the fixed supply nipple.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hose connection comprising a flexible cylindrical hose having an interior hose surface and an exterior hose surface, a helical coil spring separate from the hose and engaged around the exterior hose surface at one end of the surface such that said spring and said hose are coincident at the terminal end of said one end of the hose and that the spring has an internal surface which, in an initial unassembled condition of the connection, is a sliding friction fit around the exterior hose surface of the end of the hose, a sleeve member having an internal cylindrical bore opening at one end of the sleeve member, one end portion of the hose and one end portion of the spring being received within the cylindrical bore with a remaining part of the hose and the spring projecting outwardly from said one end of the sleeve member and an outer surface of the spring being arranged such that, in said initial unassembled condition, it is a sliding friction fit in said cylindrical bore, an opposed end of the sleeve member having an internally threaded female bore therein coaxial with said cylindrical bore and a male insert member having coupling means at one end for connection to a separate coupling and a male threaded insert portion at an opposed end, said male threaded insert portion, in a final assembled condition of said connection, being engaged in said female bore and projecting into said interior hose surface and expanding said hose at said end outwardly into engagement with the spring.

2. The connection according to claim 1 wherein the male insert portion has a threaded surface which, in said final assembled condition of said connection, is engaged with the interior surface of the hose.

3. The connection according to claim 2 wherein the male portion is threaded along substantially the whole length thereof, the threaded portion thereof having a substantially constant diameter along the whole length thereof and there being provided an inwardly tapered section of reducing diameter at an end of the insert portion remote from said coupling means.

4. The connection according to claim 1 wherein the female bore has an internal diameter substantially the same as the internal diameter of the interior surface of the hose thus defining a shoulder between the female bore and an end of the internal cylindrical bore of the sleeve member against which the end of the hose and the end of the spring abut.

5. The connection according to claim 1 including a rib projecting inwardly on an inside surface of the cylindrical bore.

6. The connection according to claim 5 wherein the rib is annular.

* * * * *